US 11,418,265 B2

(12) United States Patent
Griffith et al.

(10) Patent No.: US 11,418,265 B2
(45) Date of Patent: Aug. 16, 2022

(54) OPTICAL SIGNAL TRANSMITTER

(71) Applicant: BAE SYSTEMS plc, London (GB)

(72) Inventors: Michael Stewart Griffith, Chelmsford (GB); Andrew James Williams, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 16/770,354

(22) PCT Filed: Nov. 22, 2018

(86) PCT No.: PCT/GB2018/053379
§ 371 (c)(1),
(2) Date: Jun. 5, 2020

(87) PCT Pub. No.: WO2019/115997
PCT Pub. Date: Jun. 20, 2019

(65) Prior Publication Data
US 2021/0135768 A1 May 6, 2021

(30) Foreign Application Priority Data

Dec. 12, 2017 (GB) .................................. 1720666
Feb. 1, 2018 (EP) .................................. 18154615

(51) Int. Cl.
*H04B 10/112* (2013.01)
*H04B 10/80* (2013.01)

(52) U.S. Cl.
CPC .......... *H04B 10/80* (2013.01); *H04B 10/112* (2013.01)

(58) Field of Classification Search
None
See application file for complete search history.

(56) References Cited

U.S. PATENT DOCUMENTS 6,469,815 B1 * 10/2002 Poon .................... H04B 10/118
398/131
7,263,297 B2 * 8/2007 Verbana ............. H04B 10/1121
398/164
(Continued)

FOREIGN PATENT DOCUMENTS

EP 2615749 A1 7/2013
EP 3258623 A1 12/2017
(Continued)

OTHER PUBLICATIONS

Williams et al., Acquisition and tracking for underwater optical communications, Oct. 2017 (Year: 2017).*
(Continued)

*Primary Examiner* — Jai M Lee
(74) *Attorney, Agent, or Firm* — Finch & Maloney PLLC

(57) ABSTRACT

The invention relates to the field of Free Space Optics (FSO), more specifically it is directed to: a method of obtaining a connection between at least two optical signal nodes, of a FSO, communication system each node comprising a transmitting device and receiving device; and
transmitting via the transmitting device of a first node, a first diverged optical signal into an optical medium;
receiving at the receiving device of the second node the first diverged optical signal and transmitting via the transmitting device of the second node a second diverged signal to the receiving device of the first node to establish a location of said first node establishing a connection, after which;
the first node switches from the diverged optical signal to a narrower optical signal for the transmission of data via the connection.

20 Claims, 8 Drawing Sheets

(56) References Cited

U.S. PATENT DOCUMENTS

| | | | | |
|---|---|---|---|---|
| 7,885,548 B1* | 2/2011 | Nelson | H04B 10/1127 | 398/131 |
| 8,295,706 B2* | 10/2012 | Cunningham | H04B 10/112 | 398/131 |
| 9,203,524 B2* | 12/2015 | Simpson | H04B 13/02 | |
| 9,215,008 B2* | 12/2015 | Hastings, Jr. | H04B 10/112 | |
| 9,571,192 B2* | 2/2017 | Chalfant, III | H04B 10/112 | |
| 9,813,151 B2* | 11/2017 | Kingsbury | H04B 10/118 | |
| 9,929,806 B2* | 3/2018 | Wabnig | H04B 10/1125 | |
| 10,581,525 B2* | 3/2020 | Velazco | H04B 10/118 | |
| 10,601,506 B2* | 3/2020 | Griffith | G02B 26/127 | |
| 10,637,576 B2* | 4/2020 | Mata Calvo | H04B 10/60 | |
| 11,177,878 B2* | 11/2021 | Khatibzadeh | H04B 10/1149 | |
| 2002/0131121 A1* | 9/2002 | Jeganathan | H04B 10/1127 | 398/118 |
| 2003/0043436 A1* | 3/2003 | Nagai | H04B 10/1143 | 398/126 |
| 2004/0120718 A1* | 6/2004 | Verbana | H04B 10/1121 | 398/119 |
| 2004/0120719 A1* | 6/2004 | Andreu-von Euw | H04B 10/1127 | 398/131 |
| 2004/0141753 A1* | 7/2004 | Andreu-von Euw | H04B 10/1127 | 398/122 |
| 2005/0232638 A1* | 10/2005 | Fucile | H04B 13/02 | 398/140 |
| 2006/0239696 A1* | 10/2006 | Sayyah | H01L 27/14647 | 257/E27.135 |
| 2007/0031151 A1* | 2/2007 | Cunningham | H04B 10/1127 | 398/131 |
| 2008/0131134 A1* | 6/2008 | Dreischer | H04L 25/4902 | 398/128 |
| 2009/0269074 A1* | 10/2009 | Tidhar | H04B 10/1143 | 398/130 |
| 2011/0274434 A1* | 11/2011 | Cunningham | H04B 10/112 | 398/118 |
| 2012/0106978 A1* | 5/2012 | Jenson | H04B 10/1127 | 398/182 |
| 2014/0161466 A1 | 6/2014 | Riza | | |
| 2014/0269168 A1 | 9/2014 | Ursin et al. | | |
| 2019/0253142 A1* | 8/2019 | Griffith | H04B 10/1123 | |
| 2021/0314066 A1* | 10/2021 | Searcy | H04B 10/40 | |
| 2021/0367410 A1* | 11/2021 | Dacha | G02B 5/02 | |

FOREIGN PATENT DOCUMENTS

| | | |
|---|---|---|
| EP | 3258624 A1 | 12/2017 |
| GB | 2551355 A | 12/2017 |
| WO | 2004061483 A2 | 7/2004 |
| WO | 2017209919 A1 | 12/2017 |
| WO | 2017216537 A1 | 12/2017 |
| WO | 2019115997 A1 | 6/2019 |

OTHER PUBLICATIONS

Medhi, Von Neumann Architecture, 2012 (Year: 2012).*
Williams et al., Acquisition and tracking for underwater optical communications, 2017 (Year: 2017).*
International Search Report and Written Opinion received for PCT Application No. PCT/GB2018/053379, dated Feb. 12, 2019. 16 pages.
GB Search Report under Section 17(5) received for GB Application No. 1720666.5, dated Jun. 5, 2018. 6 pages.
Extended European Search Report received for EP Application No. 18154615.1, dated Jul. 30, 2018. 9 pages.

* cited by examiner

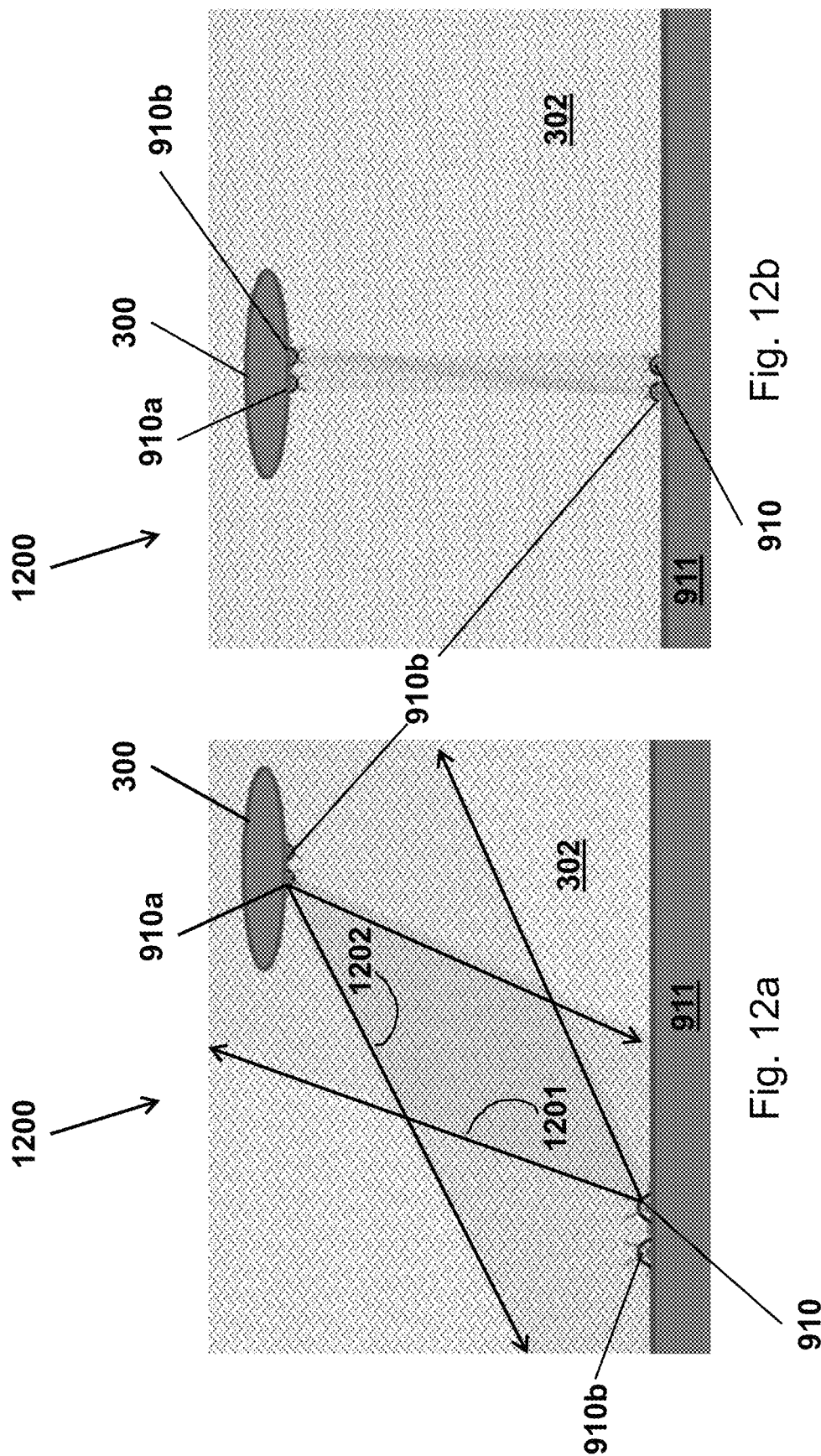

OPTICAL SIGNAL TRANSMITTER

FIELD OF THE INVENTION

The present invention relates to optical signal transmitter of Free Space Optical communication devices.

BACKGROUND

Free Space Optical (FSO) communications systems are well known for their ability to provide high data rate communications links. A FSO communication system typically consists of a pair of nodes or communication devices. Each node typically comprises an optical source, for example a laser or light emitting diode (LED), and an optical receiver. In use, the optical source of each node is aligned with the optical receiver of the other node. Modulation of optical signals emitted by the optical sources allows for the bidirectional transfer of data between the two nodes. Thus, there is a datalink between the nodes.

Most current FSO systems are mounted in fixed positions on the Earth and are manually aligned with each other. Commercial systems are available which can offer data rates of several Giga-bits per second (Gbps) over a range of several kilometres.

It is desirable to have communications systems that allow for underwater communications. Radio Frequency (RF) signals tends to be heavily attenuated by seawater, and hence the range of RF communications systems tends to be severely limited. Acoustic systems can offer low data rate transmission (kbps) over long ranges, but are typically overt which is undesirable for certain applications.

Optical communications systems have also been developed for underwater applications. Such underwater optical communications systems tend to provide relatively high data rate communications over short to medium ranges, for example up to a 300 m or so.

Like land-based FSO communication systems, an underwater optical communication system typically comprises a pair of nodes, each node will comprising an optical transmission source and receiving means, such as a detector. However, unlike land-based FSO communication systems (where node positions are typically fixed), underwater modes tend to be mobile. Hence, in underwater applications, the position of each node, and hence the range and angular separation between the nodes, is not fixed. Thus, in underwater applications, alignment between opposing optical sources and detectors tends to be required in order for the communications system to function. In addition, many underwater nodes are unmanned nodes (e.g. unmanned vehicle), and hence manual alignment between a pair of nodes tends not to be possible. Furthermore, while each underwater node may have some estimate of the relative location of the opposing underwater node (e.g. a preprogrammed location and navigation using GPS/inertial systems, or through use of a separate data link) there may be a large range and angular uncertainty in its position.

Hence, a strategy is required for each node to accurately acquire the location of the opposing node before beam alignment (and hence optical communications) can occur. In addition, since the platforms may still be mobile, active beam alignment may be required during data transfer (tracking).

SUMMARY OF THE INVENTION

The present inventors have realised that it would be beneficial for optical communication nodes or devices to be able to reliably and accurately acquire the location of the opposing node or device, for example, before beam alignment and optical communications occur. The present inventors have further realised that it would be beneficial for nodes to be capable of active beam alignment (i.e. tracking) during data transfer, particularly where a node and the opposing node are mobile nodes.

The present inventors have further realised that the previous method of using an optical beam with large divergence, for example to illuminate the area surrounding the transmitting node, tends to be very power inefficient since most of the transmitted optical power does not reach the detector of the opposing node. The present inventor have realised that such a strategy tends to only be suitable in clean water and/or at short range.

The present inventors have further realised that scanning a narrow/collimated light beam across an angular region of uncertainty may be inefficient. For example, each node in a pair of nodes may comprise an angle of arrival (AoA) light sensor. A first of the nodes may scan a narrow light beam across the angular search area. At some point during the scan, the light beam from the first node is incident on the AoA sensor of the second node, thereby allowing the second node to infer the angular location of the first node. The second node may then direct a narrow light beam towards the inferred location of the first node. The AoA sensor of the first node may then detect the beam from the second node, and, using measurements of the beam, infer the location of the second node. The first node may then stop scanning, and direct its narrow light beam in the inferred location of the second node. Communications between the nodes may then begin. However, the present inventors have realised that, for such a system and method, scanning a large angular search area with a narrow beam may take significant amount of time. Thus, acquiring the communication link tends to use increased time and/or power. The present inventors have further realised that the link margin may not be known (for example, since the water conditions and/or the range between nodes may not be known). Hence, if conditions happen to be favourable (for example, the distance between nodes is relatively short range, and/or the water through which communications are to occur is relatively clear), time may be wasted scanning the search area with a collimated beam of very high irradiance, when a scan with a larger beam (with lower irradiance) may provide the AoA sensors of the nodes with sufficient power to enable location of the other node.

The present inventors have further realised that using a lens to focus the transmitted light to produce a focussed "spot" on the communications detector tends to be highly dependent on angle of incidence of the incoming light. Thus, large incidence angles may result in all or part of the spot being displaced from the centre of the communications detector, thereby reducing the communication link margin.

The present inventors have realised it would be beneficial to provide a system and method that overcome the above mentioned deficiencies of using optical beams having large divergence and also the above mentioned deficiencies of using narrow/collimated optical beams.

In a first aspect, the present invention is a method of obtaining a connection between at least two optical signal nodes, of a Free Space Optical (FSO) communication system, each node comprising a transmitting device and receiving device; and transmitting via the transmitting device of at least one of the at least two nodes, a first diverged optical signal into an optical medium; receiving at the receiving device of the second of the at least two nodes the first diverged optical signal, transmitting via the transmitting device of the second of the at least two nodes a second diverged optical signal to the receiving device of the first of the at least two nodes to establish a location of said first of the at least two nodes, establishing a connection, after which; the first of the at least two nodes switches from the diverged optical signal to a narrower optical signal for the transmission of data via the connection.

This sequence of steps provides a power efficient method of narrowing the search areas of nodes where at least one is mobile. A static or mobile node may transmit, via the transmitting device, a first diverged optical signal into an optical medium, such as air or water, with the said signal covering as larger area as possible in order to be received by the second of the at least two optical nodes. Following this location, and subsequent optical connection, the optical signal may narrowed, thereby redistributing power originally required to operate the first divergent optical signal and instead using the available power to provide a narrower bean to provide a higher transfer rate of information. Once location and connection is established there is no further requirement to transmit a divergent optical signal into the optical medium where no receiving node is present, unless the optical connection is lost or terminated.

In one arrangement the transmitting device of one or more of the at least two optical nodes may be an optical signal transmitter, configured to transmit a plurality of optical signals. Upon location of a receiving device of a further node, the plurality of optical signals may be transmitted as a sequence of optical signals, i.e. a succession (one after another) of optical signals. The optical signals in the sequence may have progressively decreasing beam divergence and increasing irradiance.

In a further arrangement the sequence of optical signals may comprise at least a first optical signal and a second optical signal; the first optical signal having a larger divergence than the second optical signal, the second optical signal being subsequent to the first optical signal in the sequence of optical signals.

The first optical signal may be transmitted form the first optical node for acquiring a communications link with a second of the at least two optical signal nodes which forms part of the FSO communication system and may be transmitted as a plurality of pulsed transmissions. The first optical signal node may be on a first platform remote from the second optical node. The first and second optical nodes and their respective platforms forming the FSO communication system, the second optical signal located on a second platform may be transmitted from the transmitting node after a communications link between the transmitting node second platform and the first platform node has been established by transmission of the first optical signal. The second optical signal may comprise data for transmission from the second platform to the first platform via the at least two optical signal nodes located thereon.

The beam divergences of the optical signals in the sequence may be:

$$\theta_i = \frac{\theta}{2i-1} \text{ for } i = 1, 2, \ldots$$

where: i is the sequence number of an optical signal; $\theta_i$ is the beam divergence of the ith optical signal in the sequence; and $\theta$ is a maximum beam divergence of the one or more optical signal transmitters.

The irradiances of the optical signals in the sequence may be:

$$I_i = (2i-1)^2 I \text{ for } i=1,2,3,\ldots$$

where: i is a sequence number of an optical signal; $I_i$ is the irradiance of the ith optical signal in the sequence; and I is the irradiance of an optical signal having a beam divergence equal to a maximum beam divergence of the one or more optical signal transmitters.

The FSO communication system may be arranged so that at least one of the at least two optical signal nodes is located on a mobile platform such as a submersible vehicle, configured to operate while at least partially or wholly submerged in water. The optical signal transmitter of the second of the at least two optical signal nodes may be configured to transmit the modified (by and/or irradiance or divergence) optical signal into or through a volume of water.

In this way at least one of the least two optical signal nodes on the mobile platform may connect with and transmit a signal to the second optical signal node, wherein said second optical signal node may be on a mobile platform or static platform.

In one arrangement, where stealth is not a consideration, the FSO communication system may be arranged so that at least one node is a static node comprising an acoustic signal transmitter, utilised to signal its location to the other of the at least two optical signal nodes. This has significant advantages in terms of power and range of signalling, specifically in an underwater environment.

In a further arrangement at least one node of the at least two optical sensor nodes, preferably the static node may further comprises a wake-up sensor for the detection of a wake-up signal from the other of the at least two optical sensor nodes, preferably a node on a mobile platform, causing a change from a dormant state to an active state. This allows one of the at least two optical signal nodes to remain dormant, conserving power and preventing unnecessary signalling of the static node's position.

The wake-up signal received may be an identify friend or foe signal (IFF), allowing the dormant at least one node to become active when a "friendly" node on a mobile platform has signalled that it's near to at least one of the at least two optical signal nodes location, preferably the static platform's node. Upon receipt of the IFF signal the optical signal node may become active, in order to begin the method of establishing a connection.

In one arrangement the wake-up sensor is a multi-element sensor allowing for the detection of a wake-up signal as well as obtaining data as to the direction of the signal given the angle of incidence on the multi-element sensor.

The at least one node of the FSO communication system may further comprise a controller configured to control the transmission means, such an optical signal transmitter, to scan the at least part of the volume using an optical signal in a sequence of non-overlapping loops. The sequence of non-overlapping loops may be a sequence of non-overlapping, concentric circular loops. The controller may be further configured to scan the at least part of the volume by repeating one or more of the loops at least twice.

A beam divergence of the transmission of a divergent optical signal may be:

$$\phi = \frac{\theta}{2j-1}$$

Radii of the loops in the sequence of loops may be equal to:

$$r = \frac{k}{2j-1}\theta, \text{ for } k = 0, \ldots, j.$$

where θ is a maximum divergence of the optical signal transmitter, and j is an integer. j may be, for example, greater than or equal to 2.

In a further arrangement the method comprises: providing an optical signal generator, the optical signal generator being configured to generate an optical signal for transmission; and operatively coupling, to the optical signal generator, means for selectively varying a divergence and an irradiance of the generated optical signal prior to transmission of the optical signal.

In a further arrangement, the method comprises: generating an optical signal; modifying a divergence and an irradiance of the generated optical signal such that at least one of the divergence and the irradiance is equal to a preselected value; and transmitting the modified optical signal.

In a further arrangement, the method provides an FSO system comprising at least two nodes, remote from each other, each node comprising at least one optical signal transmitter wherein said optical signal transmitter, comprises least one array of a plurality of individual emitters and a lens; and at least one optical signal receiver and at least one lens, wherein the transmitter of a first node is configured to transmit a signal via the individual emitters to a second node, once the connection to the receiver of the second node is established.

In a further arrangement, the present invention may be configured, wherein upon establishing the connection one of the at least two optical signal nodes moves in the direction of the other of the at least two optical signal nodes such that the distance between the transmitting device of one of the at least two optical signal nodes and receiving device of the other at least two optical signal nodes node is decreased. The shortened distance of communication between the at least two optical signal nodes allows for the data rate between the at least two optical signal nodes to be increased to an optimised speed. Further it may increase the reliability of the connection between the at least two optical signal nodes by ensuring node tracking complexity is reduced with less opportunity for occlusion of the nodes.

BRIEF DESCRIPTION OF THE DRAWINGS

FIGS. 12a and 12b are schematic illustrations (not to scale) showing a strategic example of the optical communications system establishing a link.

DETAILED DESCRIPTION

Figure 1:
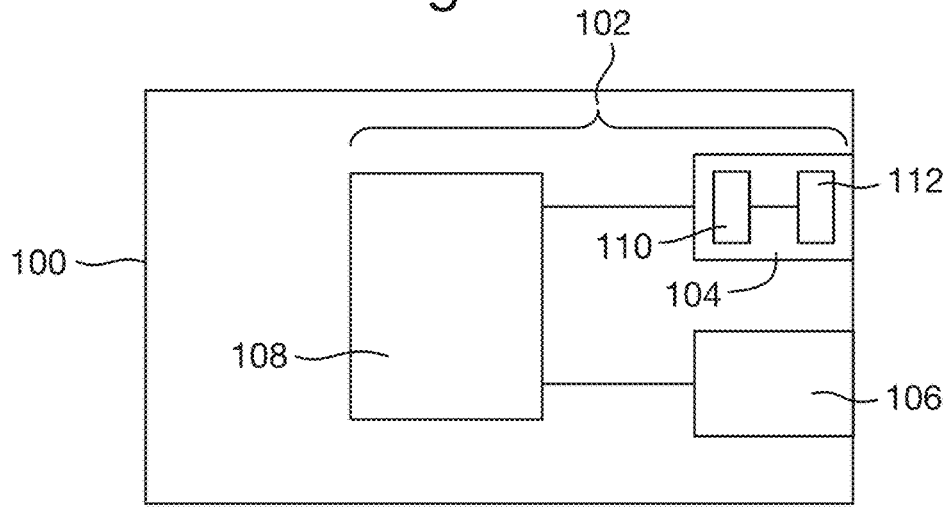
FIG. 1 is a schematic illustration (not to scale) showing a vehicle comprising an optical communications system.

FIG. 1 is a schematic illustration (not to scale) showing an example mobile platform 100 in which an arrangement of a node of a FSO communications system 102 is implemented.

The mobile platform 100 is an unmanned, submersible (or underwater) vehicle, i.e. a vehicle that is configured to operate while submerged, for example, in water.

In this arrangement, the optical communications system 102 comprises an optical signal transmitter 104, an optical signal detector 106, and a processor 108.

The optical signal transmitter 104 is configured to transmit an optical signal (such as a laser beam) from the mobile platform 100, for example a vehicle, as described in more detail later below with reference to FIGS. 2 to 9. In this arrangement, the optical signal transmitter 104 comprises an optical signal generator 110 and lens 112.

The optical signal generator 110 is configured to generate an optical signal, and send the generated optical signal to the lens 112 for transmission from the mobile platform 100. The optical signal generator 110 may comprise, for example, a laser or light emitting diode (LED). The optical signal generator 110 may be configured to modulate the generated optical signals to encode data.

In this arrangement, the lens 112 is arranged to focus the generated optical signal from optical signal generator 110, and direct the focussed optical signal away from the mobile platform 100. The lens 112 is controllable to vary the divergence of the transmitted optical signal. For example, the lens 112 may be a translating lens, a zoom lens, a fluidic lens, a programmable liquid crystal lens, or a programmable holographic lens (such as a switchable Bragg Element or a Digilens). The lens 112 is controlled by the processor 108.

The optical signal transmitter 104 is operatively coupled to the processor 108 such that the processor 108 may control operation of the optical signal transmitter 104, i.e. of the optical signal generator 110 and the lens 112.

The optical signal detector 106 is configured to detect an optical signal (such as a laser beam) incident on the optical signal detector 106, and to generate an output corresponding to the received optical signal. In this arrangement, the optical signal detector 106 comprises an Angle of Arrival (AoA) sensor having a relatively narrow Field of View (FoV).

The optical signal detector 106 is operatively coupled to the processor 108 such that the processor 108 may receive an output of the optical signal detector 106. The processor 108 is configured to process the received output of the of the optical signal detector 106 as described in more detail later below with reference to FIG. 2.

In this arrangement, the optical signal transmitter 104 is steerable such that the direction, relative to the mobile platform 100, in which an optical signal is transmitted by the optical signal transmitter 104 may be varied. Thus, an optical signal transmitted by the optical signal transmitter 104 may be scanned over an area. The steering of the optical signal transmitter 104 is controlled by the processor 108. Also, in this arrangement, the optical signal detector 106 is steerable such that the FoV of the optical signal detector 106 may be varied. The steering of the optical signal detector 106 is controlled by the processor 108.

The optical signal transmitter 104 and the optical signal detector 106 may be steered in any appropriate way. For example, in some arrangements the optical signal transmitter 104 and/or the optical signal detector 106 are mounted to a pan/tilt unit which is controlled by the processor 108. In some arrangements, one or more steering mirrors are used to steer the optical signal transmitter 104 and/or the optical signal detector 106. The one or more steering mirrors may be controlled by the processor 108.

In this arrangement, the optical signal transmitter 104 and the optical signal detector 106 are directed in substantially the same direction.

Apparatus, including the processor 108, for implementing the above arrangement, and performing the method steps to be described later below, may be provided by configuring or adapting any suitable apparatus, for example signal amplifiers, one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 2:
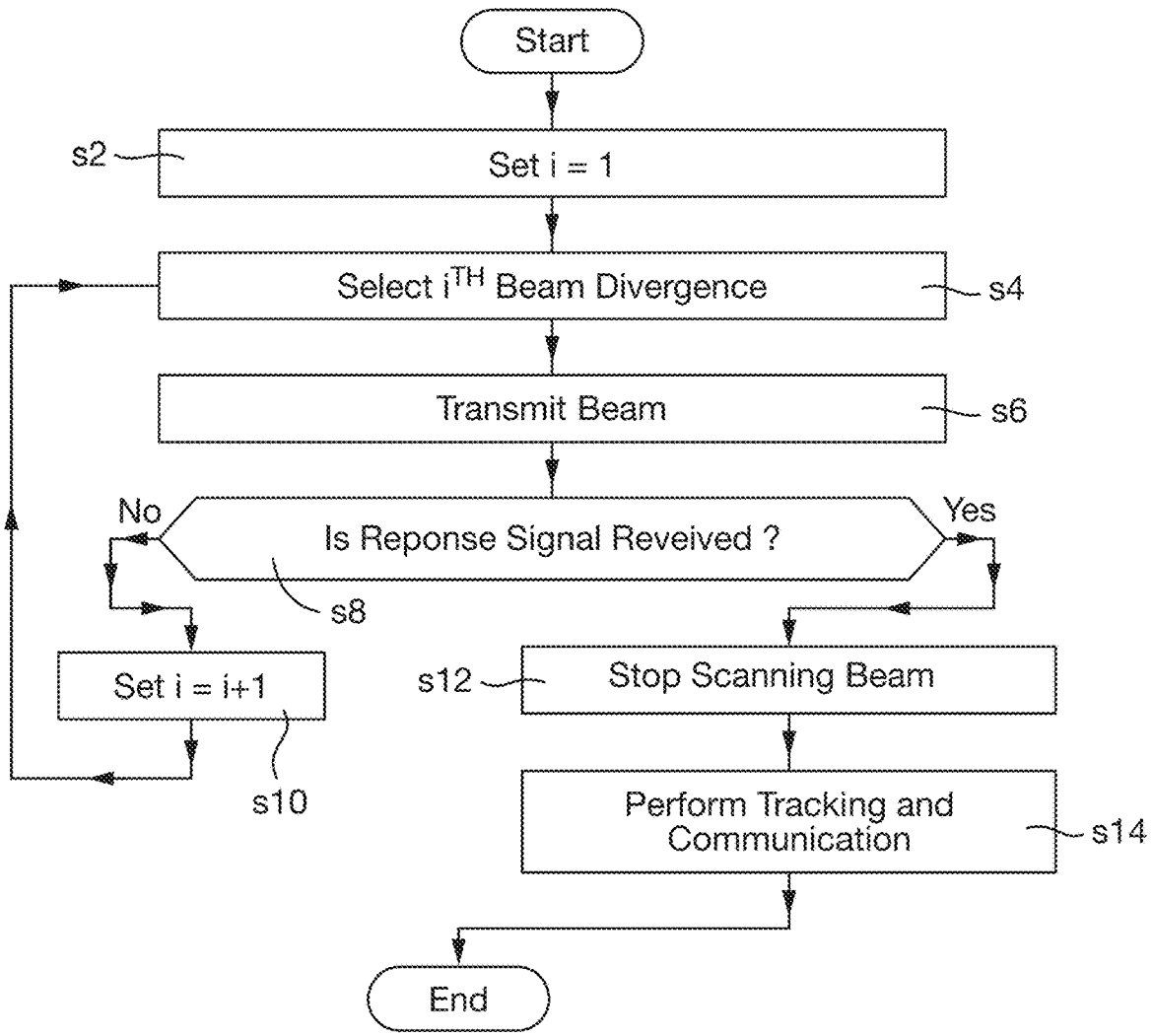
FIG. 2 is a process flow chart showing certain steps of an optical communications process.

FIG. 2 is a process flow chart showing certain steps of an arrangement of an optical communications process. In this arrangement, the optical communications process by which the mobile platform 100 communicates in an underwater environment with a further vehicle.

At step s2, the processor 108 sets the value of an iteration index, i, to be equal to one, i.e. i=1.

In this arrangement, the optical communications process comprises iteratively performing steps s4 to s8. The iteration index i is indicative of an iteration number of the process.

At step s4, the processor 108 selects a value for the divergence of the ith light beam to be transmitted from the mobile platform 100.

In this arrangement, in the first iteration of steps s4 to s8 (i.e. for i=1), the value for the divergence of the first light beam to be transmitted from the mobile platform 100 is selected to be as large as possible, i.e. the largest possible beam divergence that is achievable by the lens 112.

At step s6, the processor 108 controls the optical signal transmitter 104 to transmit a light beam having the selected beam divergence.

Figure 3:
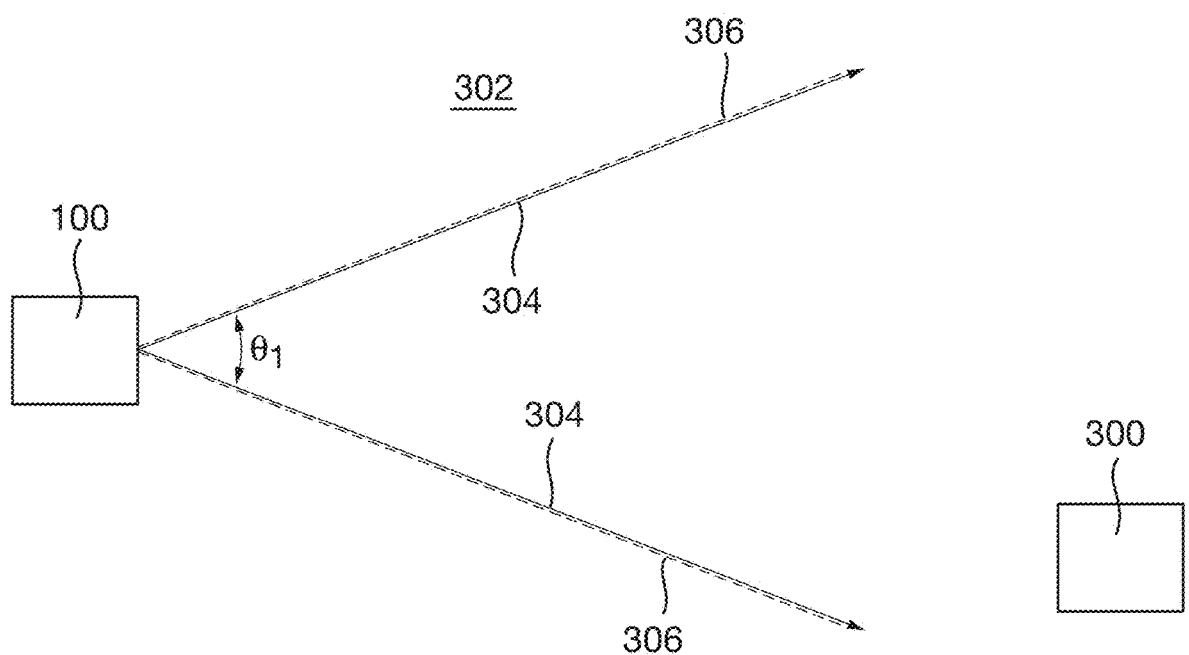
FIG. 3 is a schematic illustration (not to scale) showing transmission of a first light beam from the vehicle.

FIG. 3 is a schematic illustration (not to scale) showing transmission of the first light beam at the (i=1)th iteration of step s6.

In this arrangement, the mobile platform 100 transmits the first light beam in a direction of the further vehicle 300, through an optical medium 302 which, in this arrangement, is water (for example, seawater).

The first light beam is indicated in FIG. 3 by two solid arrows and the reference numeral 304. The first light beam 304 is bounded by these arrows. In this arrangement, the first light beam 304 has a divergence of $\theta_1$, where $\theta_1$ is the maximum divergence achievable by the optical signal transmitter 104.

In this arrangement, the first light beam 304 substantially covers the entirety of a search area or search volume, which is indicated in FIG. 3 by dotted lines and the reference numeral 306. The search area 306 is an area in which the mobile platform 300 is to transmit light beam to attempt to establish a communications link with the further vehicle 300. In this arrangement, since, in the first iteration i=1, the first light beam 304 covers all of the search area 306, the first light beam 304 is not scanned across the search area 306. In particular, in this arrangement, the search area 306 is defined by the value $\theta_1$.

In this arrangement, the further vehicle 300 comprises an optical communications system capable of detecting optical signals incident on the further vehicle 300 and further configured to transmit optical signals. For example, in some arrangements, the further vehicle 300 may comprise the optical communications system 102 described in more detail earlier above with reference to FIG. 1.

In this arrangement, the communications conditions (for example the distance between the mobile platform 100 and the further vehicle 300, and/or the turbidity of the water 302) are such that an optical detector on board the further vehicle 300 does not receive sufficient power from the first light beam 304 to enable it to detect the first light beam 304. In other words, the first light beam 304 is attenuated by the water 302 to such a degree that, in effect, the first light beam 304 is not received by the further vehicle 300.

Because, in the first iteration i=1, the further vehicle 300 does not detect the light beam transmitted by the mobile platform 100, the further vehicle 300 does not transmit a response optical signal towards the mobile platform 100.

However, in other arrangements, the communications conditions may be more favourable and such that the wide first beam 304 is received and detected by the optical detector of the further vehicle 300. In this case, the further vehicle 300 will transmit a response signal back to the mobile platform 100, which is received at the mobile platform 100, as described in more detail later below with reference to FIG. 8.

At step s8, the processor 108 determines whether or not the optical signal detector 106 has detected an incident optical signal. In particular, in this arrangement, the processor 108 determines whether or not the optical signal detector 106 has detected a response optical signal from the further vehicle 300.

If at step s8, the processor 108 determines that the optical signal detector 106 has detected an incident optical signal, the method proceeds to step s12. Steps s12 to s14 will be described in more detail later below after a description of step s10 and subsequent iterations (i=2, 3, . . . ) of steps s4 to s8.

However, if at step s8, the processor 108 determines that the optical signal detector 106 has not detected an incident optical signal, the method proceeds to step s10.

At step s10, the processor 108 increase the value of the iteration index, i, by one, i.e. i=i+1.

After step s10, the method proceeds back to step s4 for a next iteration of steps s4 to s8.

In this arrangement, in the subsequent iterations of step s4, the processor 108 selects successively decreasing values for the divergence of the light beam to be transmitted from the mobile platform 100. In other words, in each iteration of step s4, the processor 108 selects a value for the divergence of the light beam that is lower than the value selected in the previous iteration.

In particular, in this arrangement, at each iteration of step s4, the processor 108 selects the value for the divergence of the light beam to be transmitted from the mobile platform 100 using the following formula:

$$\theta_i = \frac{\theta_1}{2i-1} \text{ for } i = 1, 2, 3, \ldots$$

where: i is the iteration index, i=1, 2, 3, . . . ;

$\theta_i$ is the selected light beam divergence for the ith iteration;

$\theta_1$ is the maximum light beam divergence achievable by the lens 112.

Thus, for example, in a second iteration (i=2) of steps s4 to s8, the selected beam divergence is $\theta_1/3$; in a third iteration (i=3) of steps s4 to s8, the selected beam divergence is $\theta_1/5$; in the fourth iteration (i=4) of steps s4 to s8, the selected beam divergence is $\theta_1/7$; and so on.

In this arrangement, the divergence of the transmitted light beams in the subsequent iterations of step s6 (i.e. iterations i=2, 3, . . . ) is less than that in the first iteration, i=1. Thus, in subsequent iterations of step s6, the transmitted light beam will not cover the entirety of the search area 306 at the same time. Thus, in this arrangement, in the subsequent iterations of step s6, the processor 108 controls the optical signal transmitter 104 to scan the transmitted light beam across all of the search area 306.

In particular, in this arrangement, at each iteration of step s6, the processor 108 controls the optical signal transmitter 104 to scan the transmitted light beam in a sequence of non-overlapping concentric circles, as described in more detail below with reference to FIGS. 4 to 7.

In this arrangement, the power used to generate the light beam is substantially the same for each iteration. Thus, decreasing the divergence of the light beam increases its irradiance. In other words, in each iteration of step s6, the irradiance of the light beam is higher than the irradiance in the previous iteration. Thus, at subsequent iteration, the light tends to penetrate through the water 302 to a greater extent, in effect increasing the acceptable attenuation of the signal through the water path.

In particular, in this arrangement, at each iteration of step s6, the irradiance of the transmitted light beam tends to be in accordance with the following formula:

$$I_i = (2i-1)^2 I_1 \text{ for } i=1,2,3, \ldots$$

where: i is the iteration index, i=1, 2, 3, . . . ;

$I_i$ is the irradiance of the ith light beam;

$I_1$ is the irradiance of the first light beam 304.

Figure 4:
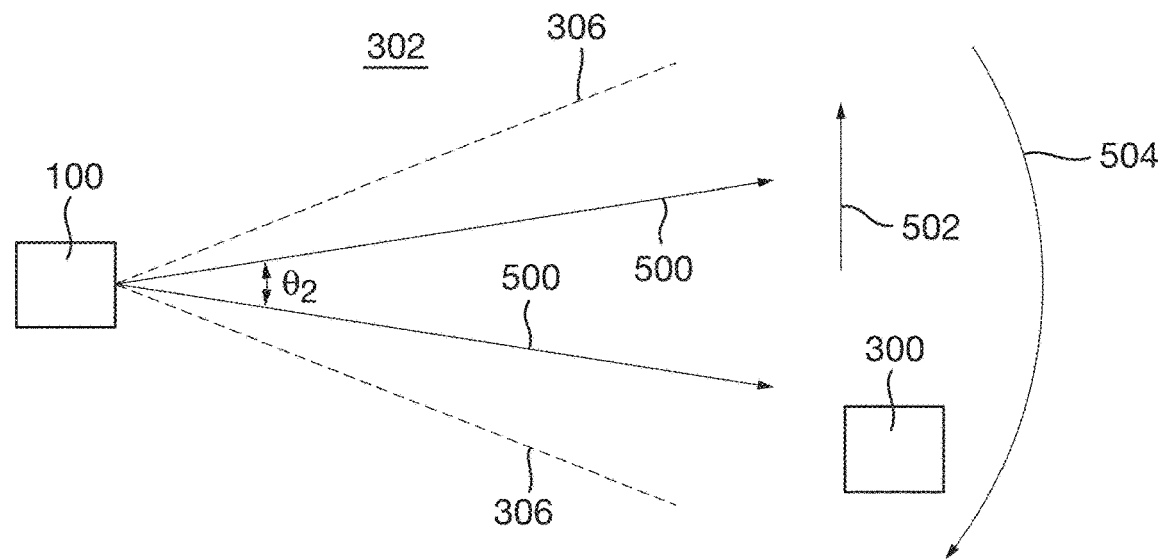
FIG. 4 is a schematic illustration (not to scale) showing transmission of a second light beam from the vehicle.

FIG. 4 is a schematic illustration (not to scale) showing transmission of the light beam at the (i=2) iteration of step s6.

In this arrangement, the mobile platform 100 transmits the second light beam 500 (bounded by solid arrows) in a direction of the further vehicle 300, through the optical medium 302. The second light beam 500 has a divergence of $\theta_2$, which, in this arrangement, is equal to $\theta_1/3$.

By decreasing the divergence of the beam (from $\theta_1$ to $\theta_2$), the effective range of the optical communication system 102 is increased.

In this arrangement, to cover the entirety of the search area 306, the second light beam 500 is scanned in a pattern indicated in FIG. 4 by arrows and the reference numerals 502 and 504, and described in more detail below with reference to FIG. 5.

Figure 5:
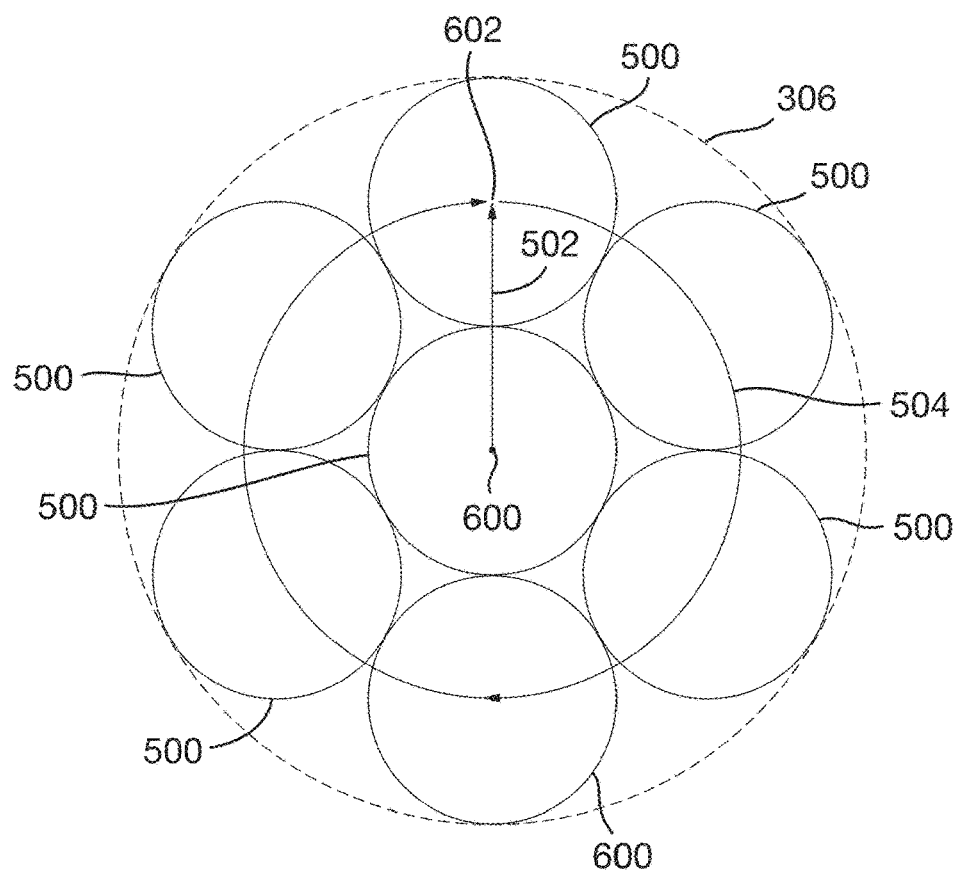
FIG. 5 is a schematic illustration (not to scale) showing a scan pattern used for the second light beam.

FIG. 5 is a schematic illustration (not to scale) showing a scan pattern implemented by the optical communications system 102 to scan the second light beam 500 over the search area 306.

FIG. 5 shows the search area 306 from the point of view of the mobile platform 100. In this arrangement, from the point of view of the mobile platform 100, the search area 306 is substantially circular.

In this arrangement, the search area 306 is scanned as follows.

Firstly the processor 108 controls the optical signal transmitter 104 to transmit a light beam at the centre 600 of the search area 306. In particular, the optical signal transmitter 104 is centred with respect to the search area 306.

Secondly, after scanning at the centre 600 of the search area 306, the processor 108 controls the optical signal transmitter 104 to move its FoV towards the edge of the search area 306 through an angular distance of $\theta_1/3$ (i.e. the divergence of the light beam 500 in this iteration). In particular, the optical signal transmitter 104 is centred at point 602 shown in FIG. 5. This movement is indicated in FIG. 5 by a straight arrow and the reference numeral 502.

Thirdly, the processor 108 controls the optical signal transmitter 104 to scan an outer portion of the search area 306 by moving its FoV in a circular loop about the centre 600. This movement is indicated in FIG. 5 by an arrow and the reference numeral 504. Thus, an annulus surrounding the scanned central portion is scanned.

Advantageously, the scanned circular loop 504 does not overlap with the originally scanned central portion. Thus, scanning of the search area 306 tends to be efficient in term of both time and power.

In this arrangement, the processor 108 controls the optical signal transmitter 104 to scan the circular loop 504 twice. This double scanning of the circular loop advantageously tends to facilitate the detection of a return signal by the mobile platform 100, as described in more detail later below.

In this arrangement, the communications conditions are such that an optical detector on board the further vehicle 300 does not receive sufficient power from the second light beam 500 to enable it to detect the second light beam 500. In other words, the second light beam 500 is attenuated by the water 302 to such a degree that, in effect, the second light beam 500 is not received by the further vehicle 300.

Because, in the second iteration i=2, the further vehicle 300 does not detect the light beam transmitted by the mobile platform 100, the further vehicle 300 does not transmit a response optical signal towards the mobile platform 100. Thus, in the second iteration of step s8, the processor 108 determines that no response optical signal is received at the optical signal detector 106, and a third iteration (i=3) of steps s4 to s8 is performed.

Figure 6:
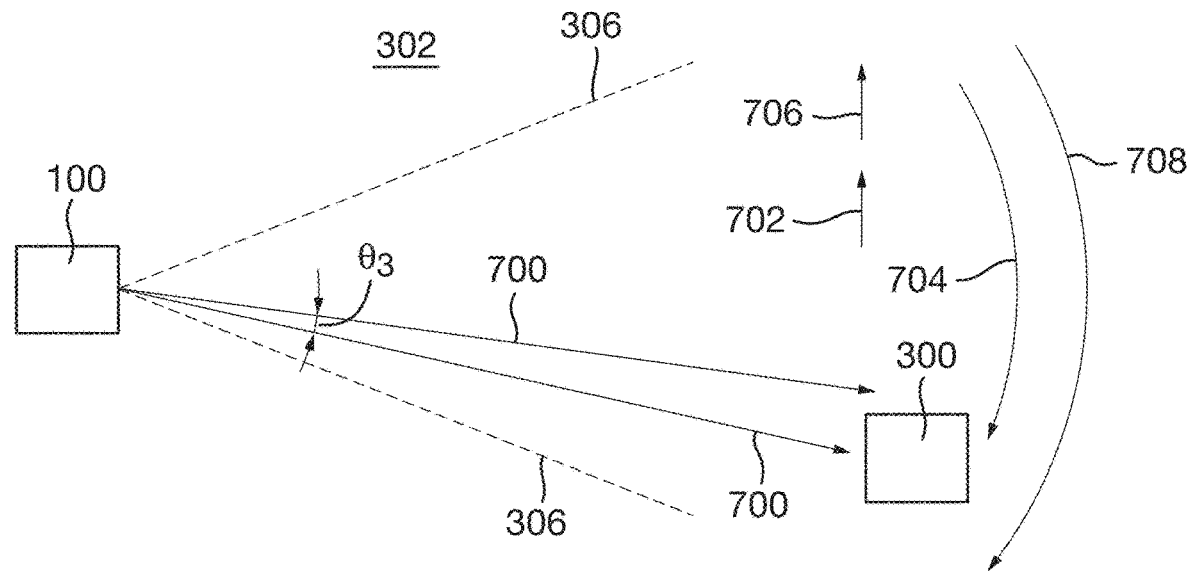
FIG. 6 is a schematic illustration (not to scale) showing transmission of a third light beam from the vehicle.

FIG. 6 is a schematic illustration (not to scale) showing transmission of the light beam at the (i=3) iteration of step s6.

In this arrangement, the mobile platform 100 transmits the third light beam (bounded by solid arrows 700) in a direction of the further vehicle 300, through the optical medium 302. The third light beam 700 has a divergence of $\theta_3$, which, in this arrangement, is equal to $\theta_1/5$.

By decreasing the divergence of the beam (from $\theta_2$ to $\theta_3$), the effective range of the optical communication system 102 is increased.

In this arrangement, to cover the entirety of the search area 306, the third light beam 700 is scanned in a pattern indicated in FIG. 6 by arrows and the reference numerals 702-708, and described in more detail below with reference to FIG. 7.

Figure 7:
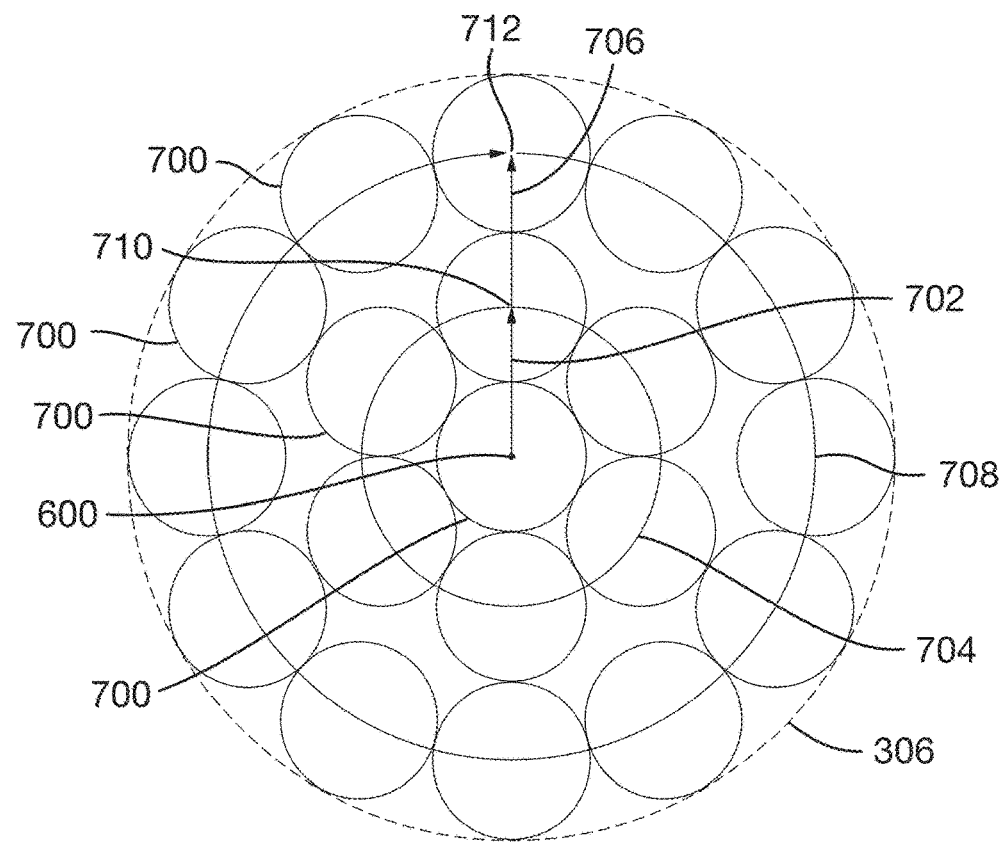
FIG. 7 is a schematic illustration (not to scale) showing a scan pattern used for the third light beam.

FIG. 7 is a schematic illustration (not to scale) showing a scan pattern implemented by the optical communications system 102 to scan the third light beam 700 over the search area 306. FIG. 7 shows the search area 306 from the point of view of the mobile platform 100.

In this arrangement, the search area 306 is scanned as follows.

Firstly the processor 108 controls the optical signal transmitter 104 to transmit the third light beam 700 at the centre 600 of the search area 306. In particular, the optical signal transmitter 104 is centred with respect to the search area 306.

Secondly, after scanning at the centre 600 of the search area 306, the processor 108 controls the optical signal transmitter 104 to move its FoV towards the edge of the search area 306 through an angular distance of $\theta_1/5$ (i.e. the divergence of the light beam 500 in this iteration). This movement is indicated in FIG. 7 by a straight arrow and the reference numeral 702. The optical signal transmitter 104 is centred at point 710 shown in FIG. 7.

Thirdly, the processor 108 controls the optical signal transmitter 104 to scan an annular portion of the search area 306 by moving its FoV in a circular loop about the centre 600, maintaining the separation between the centre 600 and the transmitted light beam. This movement is indicated in FIG. 7 by an arrow and the reference numeral 704. Thus, an annulus surrounding the scanned central portion is scanned. Advantageously, this scanned circular loop 704 does not overlap with the originally scanned central portion. Thus, scanning of the search area 306 tends to be efficient in term of both time and power.

In this arrangement, the processor 108 controls the optical signal transmitter 104 to scan the circular loop 704 twice.

Next, after scanning the circular loop 704, the processor 108 controls the optical signal transmitter 104 to move its FoV towards the edge of the search area 306 through an angular distance of $\theta_1/5$ (i.e. the divergence of the light beam 500 in this iteration). This movement is indicated in FIG. 7 by a straight arrow and the reference numeral 706. The optical signal transmitter 104 is centred at point 712 shown in FIG. 7.

Lastly, the processor 108 controls the optical signal transmitter 104 to scan an outer annular portion of the search area 306 by moving its FoV in a circular loop about the centre 600, maintaining the separation between the centre 600 and the transmitted light beam. This movement is indicated in FIG. 7 by an arrow and the reference numeral 708. Thus, an annulus surrounding the scanned central portion and the circular loop 704 is scanned. Advantageously, this scanned circular loop 704 does not overlap with the originally scanned central portion or the scanned circular loop 704. Thus, scanning of the search area 306 tends to be efficient in term of both time and power.

In this arrangement, the processor 108 controls the optical signal transmitter 104 to scan the circular loop 708 twice.

More generally, the relationship between the iteration number and the number of concentric circular loops to be scanned is given by the following formula:

$$N_i = i - 1, \text{ for } i = 1, 2, 3, \ldots$$

where $N_i$ is number of concentric circular loops to be scanned at the ith iteration of steps s4 to s8. Thus, for example, at the second iteration, i=2, there is one loop 504 scanned about the central portion of the search area 306. Also, at the third iteration, i=3, there are two loops 704, 708 scanned about the central portion of the search area 306.

Also, the relationship between the iteration number and the radii of concentric circular loops to be scanned is given by the following formula:

$$r_i = \frac{k}{2i-1}\theta_1, \text{ for } k = 0, \ldots, i$$

where $r_i$ is the radius (i.e. a distance between the centre of the search area 306 and the centre of the FoV of the optical signal transmitter 104) of a loop at the ith iteration of steps s4 to s8. Thus, for example, at the second iteration, i=2, the radius of the loop 504 scanned about the centre 600 of the search area 306 is $\theta_1/3$. Also, at the third iteration, i=3, the radii of the two loops 704, 708 are $\theta_1/5$ and $2\theta_1/5$ respectively.

It should be noted that FIGS. 5 and 7 show the plane of the scan pattern and in order to create the scan pattern shown in the figures a pointing angle of the optical signal transmitter 104 is changed where the pointing angle defines the direction of the scan.

In this arrangement, the communications conditions and the increased irradiance of the third beam 700 are such that an optical detector on board the further vehicle 300 receives sufficient power from the third light beam 700 to enable it to detect the third light beam 700.

Figure 8:
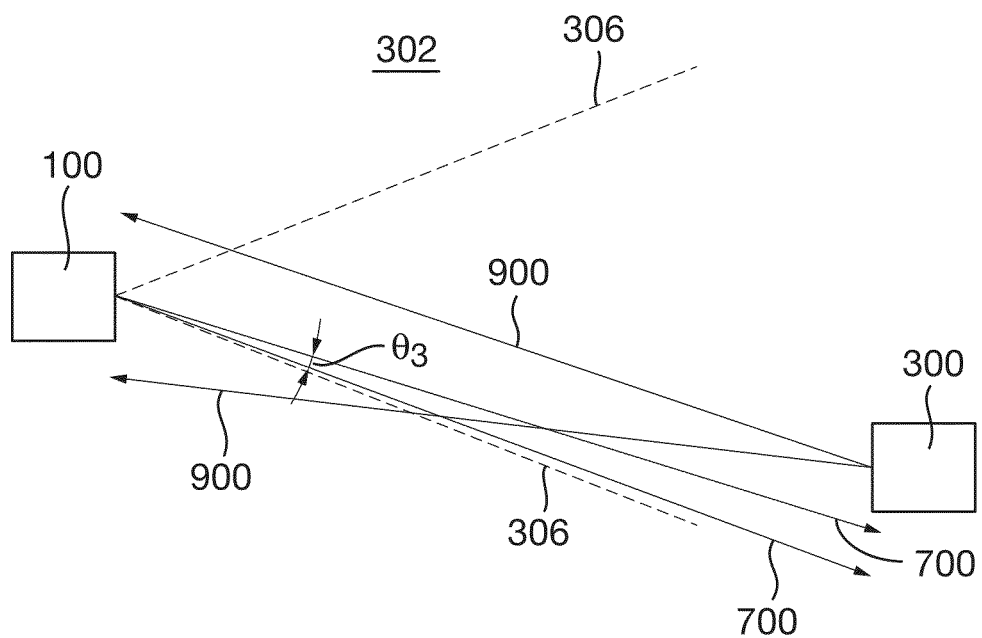
FIG. 8 is a schematic illustration (not to scale) showing a further vehicle transmitting a response light beam the vehicle in response to the further vehicle detecting the third light beam.

As shown in FIG. 8, in this arrangement, the further vehicle 300 detects the third light beam 700 transmitted by the mobile platform 100. A processor of the further vehicle 300 then determines a location of the mobile platform 100 using the measured third light beam 700. The further vehicle 300 then uses the determined location to transmit a response light beam 900 back towards the mobile platform 100.

In this arrangement, when the third beam 700 from the mobile platform 100 scans over the optical detector of the further vehicle 300 with sufficient irradiance, there is a finite time before the further vehicle 300 can direct a response light beam back towards the mobile platform 100. By the time the further vehicle 300 does this, the mobile platform 100 may have moved the third light beam 700 away from the further vehicle 300. Thus, the response light beam from the further vehicle 300 may be outside the FoV of the optical signal detector 106 of the mobile platform 100. In this arrangement, as described above, at iterations i=2, 3, and so on, the search area 306 is scanned in a sequence of non-overlapping concentric circular loops (e.g. loops 504, 704, 708). Each of these loops is repeated twice. Thus, advantageously, if the FoV of the optical signal detector 106 is moved away from the response light beam from the further vehicle 300 in the first performance of a scanning loop, the optical signal detector 106 is directed towards the response light beam from the further vehicle 300 in the second performance of that scanning loop.

Thus, the response optical signal tends to be received by the mobile platform 100.

Thus, in the third iteration of step s8, the processor 108 determines that a response optical signal is received at the optical signal detector 106.

Returning now to the description of FIG. 2, in response to the processor 108 determining that a response optical signal is received at the optical signal detector 106 at some iteration of step s8, the method proceeds to step s12.

At step s12, the processor 108 stops the optical signal transmitter 104 scanning the search area 306.

At step s14, the processor 108 determines a location of the further vehicle 300 using the measured response light beam 900. The processor 108 then uses the determined location of the further vehicle 300 to transmit a communication optical signal to the further vehicle.

Figure 9:
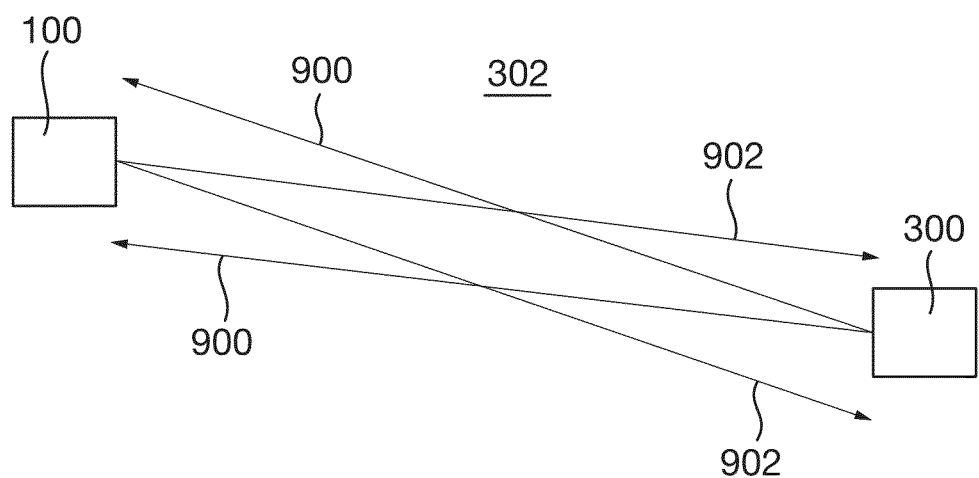
FIG. 9 is a schematic illustration (not to scale) showing two-way Free Space Optical communications between the vehicles and the further vehicle.

FIG. 9 is a schematic illustration (not to scale) showing the communication optical signals 900, 902 being transmitted between the mobile platform 100 and vehicle 300.

Thus, a two-way communication link between the mobile platform 100 and vehicle 300 is provided.

In this arrangement, a tracking process is performed to actively align the light beams 900, 902 during data transfer between the mobile platform 100 and vehicle 300.

Thus, an optical communications process between submersible vehicles in an underwater environment is provided.

Advantageously, the above described method and apparatus allow one or more nodes of an optical communications system to efficiently and robustly acquire the location of one or more other nodes in a relatively short period of time.

The above described system and method tends to facilitate the acquisition of a datalink between two nodes.

The above described system and method is particularly useful in environments in which certain parameters (including, for example, range between nodes, turbidity of optical medium, locations of nodes, etc.) are unknown.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

In the above arrangements, the optical communication system is implemented on board an unmanned submersible vehicle. Also, optical communications is performed between two submersible water vehicles. However, in other arrangements the optical communication system is implemented on a different entity, such as a building, a static underwater sensor node, or a different type of vehicle such as a manned submersible vehicle, a land-based vehicle, or an aircraft. In some arrangements, optical communications is performed between a number of different entities, such as more than two entities. Also, optical communications may be performed through more than one type of optical medium, such as through both air and water, e.g. if only one of the entities is underwater while the other is not underwater.

In the above arrangements, the optical signal transmitter and the optical signal detector are mechanically steerable. However, in other arrangements one or both of the transmitter and the detector is electronically steerable. In some arrangements one or both of the transmitter and the detector is not steerable relative to the mobile platform. For example, in some arrangements, the optical signal transmitter and the optical signal detector are fixed relative to mobile platform, and the mobile platform is moved to vary the directions of the FoVs of the transmitter and the detector.

In the above arrangements, the light beam is not scanned during a first iteration of steps s4 to s8. However, in other arrangements, for example in arrangements in which the search area is larger than the maximum beam divergence, the first light beam is scanned over an area. In some arrangements, the first iteration of steps s4 to s8 may be, in effect, omitted, and the method may begin with iteration number 2, or higher.

In the above arrangements, the loops in which the optical signal transmitter is moved across when scanning the search area are substantially circular. Also, each loop is followed twice. However, in other arrangements, one or more of the loops is a different shape, i.e. not circular. Also, in some arrangements, one or more of the loops is scanned a different number of times, for example, once (e.g. if the mobile platform is equipped with an AoA sensor having a wide FoV), or more than twice.

In the above arrangements, the divergence of a transmitted beam is varied for the purpose of establishing a communications link between the mobile platform and the further vehicle. However, in other arrangements, the beam divergence may be varied for a different purpose, for example for data transfer after the communications link is established.

What will now be described is a further arrangement of an optical communications system that transmits wide divergence optical beams to establish or acquire a communications link with a different entity, and then transmits a narrow divergence beam for data transfer to and/or from that entity. In one example of the invention the first node transmits via a high powered emitter (e.g. light source) prior to connection with the second node, and following connection with the second node transmits via a lower powered emitter.

Figure 10:
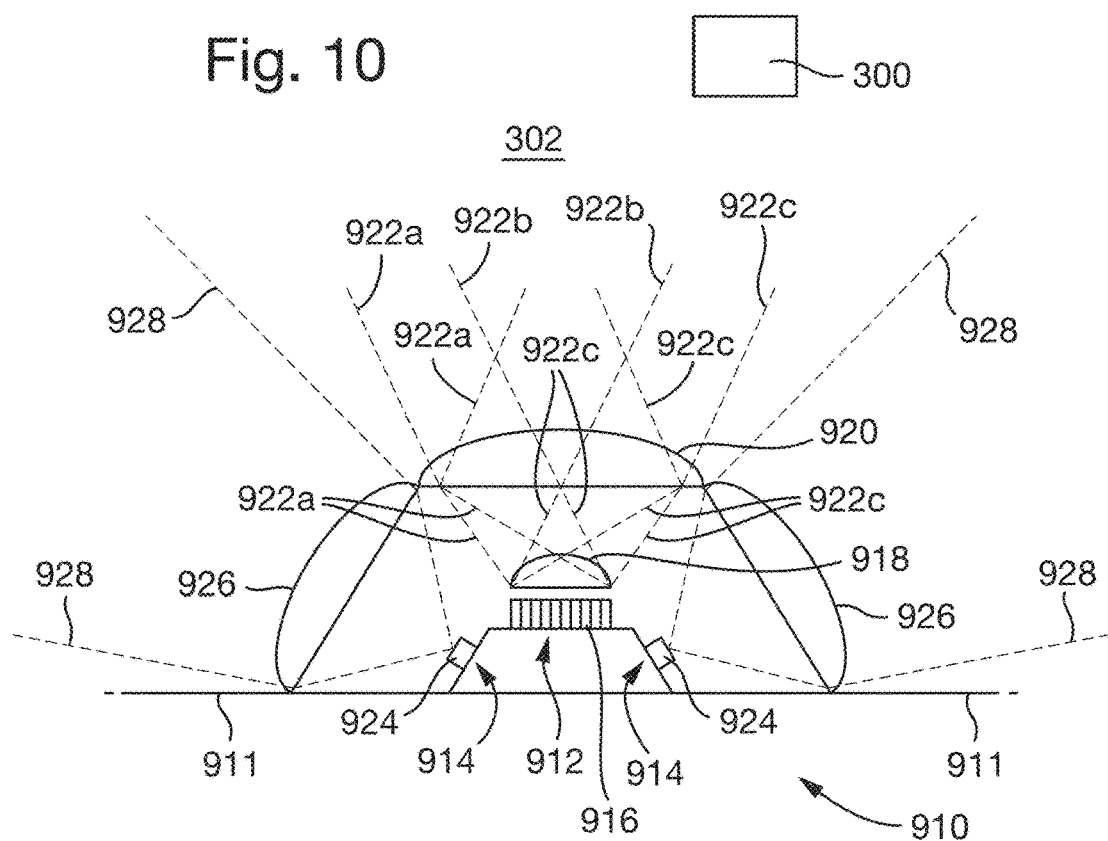
FIG. 10 is a schematic illustration (not to scale) showing a further optical communications system acquiring a communications link.

FIG. 10 is a schematic illustration (not to scale) showing an arrangement of an optical communications system node 910.

In this arrangement, the optical communications system node 910 is submersed in water 302, which may be sea water. The optical communications system node 910 is fixed to a surface 911, which may be, for example, a sea bed.

The optical communications system node 910 comprises three subsystems, namely a central subsystem 912, and two further subsystems 914 positioned at opposite sides of the central sub-system 912.

In this arrangement, the optical communications system node 910 further comprises one or more optical detectors (not shown) for detecting incident optical signals. For example, transmit and receive modules may be combined into a single module, thereby providing a system of reduced size. For example, in some arrangements an emitter, such as a light source/s are located at the centre of one or more (e.g. each) optical detector elements. This emitter may be, for example, an LED, Laser diode, VCSEL (Vertical Cavity Surface Emitting Laser), or an optical fibre coupled to a laser, an LED, or a VCSEL. In some arrangements, the light source is located between the optical detectors. This tends to reduce the impact of adding a light source to the detector element.

However, in some arrangements, the optical communications system node 910 does not include an optical detector, and may, for example, be used together with a separate receive module.

In this arrangement, the central subsystem 912 comprises an array of optical signal transmitters 916, a first lens 918, and a fluidic lens 920. The array of optical signal transmitters 916 comprises a plurality of optical transmitters which may be controlled, e.g. by a controller (not shown) coupled to the array 916, to electronically steer a light beam transmitted by the array 916. Three examples of steered light beams transmitted by the array 916 are shown in FIG. 10 as bounded by respective pairs of dotted lines and indicated by the reference numerals 922a, 922b and 922c respectively. In this arrangement, the array of optical transmitters 916 is arranged to transmit optical signals 922a-c to the first lens 918. The first lens 918 focusses the optical signals 922a-c onto the fluidic lens 920, from which the optical signals 922a-c are emitted into the water 302.

In this arrangement, each of the further subsystems 914 comprises a respective optical signal transmitter 924 and a respective lens 926. For each further subsystem 914, the optical transmitter 924 of that subsystem 914 is arranged to transmit respective optical signals 928 to the lens 926 of that subsystem 914, from which those optical signals 928 are emitted into the water 302.

In other arrangements, the optical communications system node 910 comprises a different number of subsystems, e.g. more than three. For example, in some arrangements, the optical communications system comprises a central subsystem and a plurality (e.g. 6) further subsystem arranged around the periphery of the central subsystem, each further subsystem facing in a different respective direction. In some arrangements, multiple subsystems comprise fluidic lenses.

The optical communications system node 910 is shown in FIG. 10 performing a process of acquiring a communications link with the further vehicle 300. During performance of this process of acquiring a communications link, the fluidic lens 920 is controlled such that the divergence of the transmitted beam 922a-c is relatively large (e.g. greater than or equal to 50°, e.g. 50° to 60°). For example, the fluidic lens 920 may be controlled such that the beam divergence of an optical signal 922a-c transmitted by the central sub-system 912 is a maximum achievable beam divergence.

Also, the lenses 926 are configured such that the divergences of the light beams 928 transmitted by the further subsystems 914 are relatively large (e.g. greater than or equal to 50°, e.g. 50° to 60°).

During the process of acquiring a communications link, the transmitted light beams 922a-c 928 may be, for example, continuous wave (CW) beams, alternating current (AC) modulated beams, low data rate optical signals for performing an Identification Friend or Foe (IFF) process, or a combination thereof.

In this arrangement each of the subsystems 912, 914 have a respective different facing. In other words, the central sub-system 912 and each of the further sub-systems 914 is configured to transmit optical signals into the water 302 in a different direction. This arrangement may be arranged such that a plurality of further optical sensors disposed around a peripheral edge of the central optical sensor.

Advantageously, transmission of wide divergence light beams in a plurality of different directions by the optical communications system node 910 tends to increase the likelihood that the further vehicle 300 receives an optical signal.

After receiving a wide divergence light beam transmitted by the optical communications system node 910, the further vehicle 300 transmits a response optical signal to the optical communications system node 910. The optical communications system node 910 receives the response optical signal from the further vehicle 300 and performs tracking and communication, for example, as described in more detail earlier above with reference to step s14.

Figure 11:
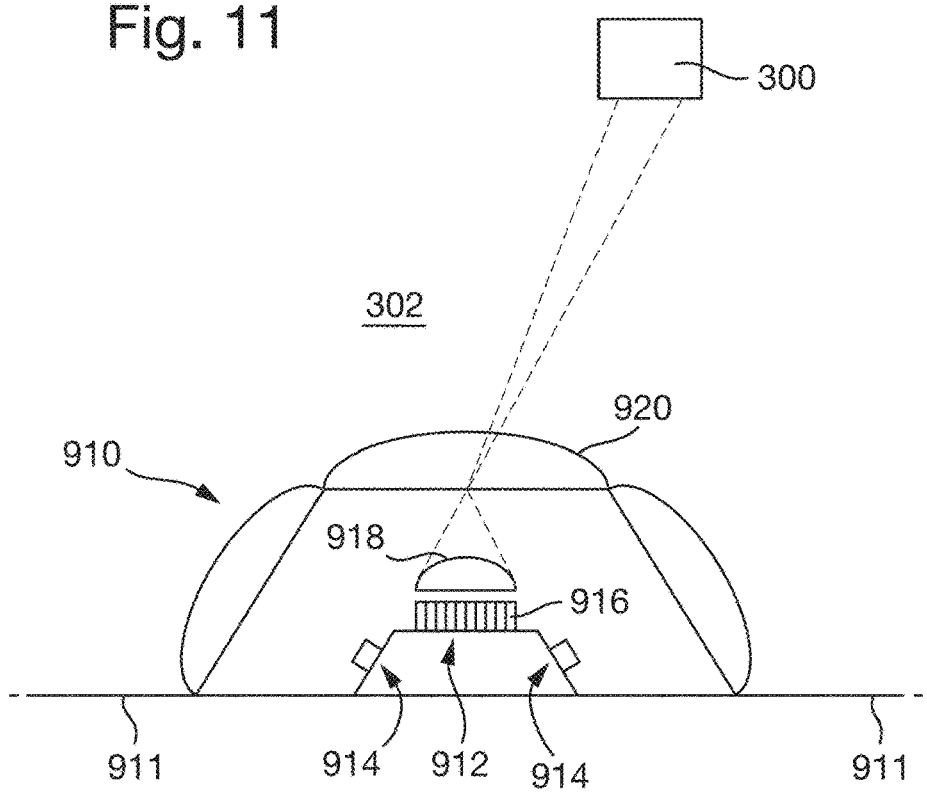
FIG. 11 is a schematic illustration (not to scale) showing the further optical communications system performing tracking and communication processes.

FIG. 11 is a schematic illustration (not to scale) showing the optical communications system node 910 tracking and communicating with the further vehicle 300.

In this arrangement, the optical communications system node 910 determines the relative location of the further vehicle 300 using the response optical signal received from the further vehicle 300. The array 916 is then controlled (e.g. by the controller) to transmit a further optical signal 930 to the further vehicle 300. In this arrangement, the further optical signal 930 encodes data that is being transferred (for example, at a higher rate compared to the transfer of any data occurring during the communication acquisition process shown in FIG. 10) between the optical communications system node 910 and the further vehicle 300. The further optical signal 930 has a higher signal level than the optical signals 922a-c, 928 transmitted during the communication acquisition process shown in FIG. 10.

In this arrangement, the array 916 is controlled (e.g. by the controller) so that the further optical signal 930 is electronically steered towards the further vehicle 300.

Also, the fluidic lens 920 is controlled (e.g. by the controller) so that the further optical signal 930 has a relatively narrow beam divergence compared to the divergences of the beam 922a-c, 928 transmitted during the communication acquisition process shown in FIG. 10. The further optical signal 930 may also have increased irradiance compared to the irradiances of the beam 922a-c, 928 transmitted during the communication acquisition process. In some arrangements, the beam divergence and/or the irradiance of the further optical signal 930 is determined (e.g. optimised) based on a determination of a distance between the optical communications system node 910 and the further vehicle 300.

Thus, a further arrangement of an optical communications system is provided.

In FIG. 12a and FIG. 12b, there is provided a strategic view of an FSO communications system 1200, during a connection to be made in optical medium of water 302. The communications system 1200 has at least one optical signal node 910, which may be a node as previously described in FIG. 10 or 11, positioned statically on the sea bed 911 and a further node 910a positioned on a mobile platform 300.

FIG. 12a provides an example of the acquisition of a further node 910a of the FSO communications system 1200, whereby a first signal 1201 is transmitted into free space underwater 302 in search of the further node 910a, said first signal 1201 being highly diverged with, as a result, low irradiance. Once the first signal is received by the further node 910a it responds by conducting a similar action, transmitting a response signal 1202, which is highly diverged, in search of the optical communications system node 910, and so beginning the connection process.

Once the location of the further node 910a and the optical communications system node 910 has been established, the first signal 1201 may be narrowed and irradiance increased, this can be carried out by the original optical communications system node 910 and further node 910a or by separate support nodes 910b, dedicated to data transmission rather than node acquisition, thereby allowing a set of nodes to maintain location of other node positions during data transfer.

Figure 13B:
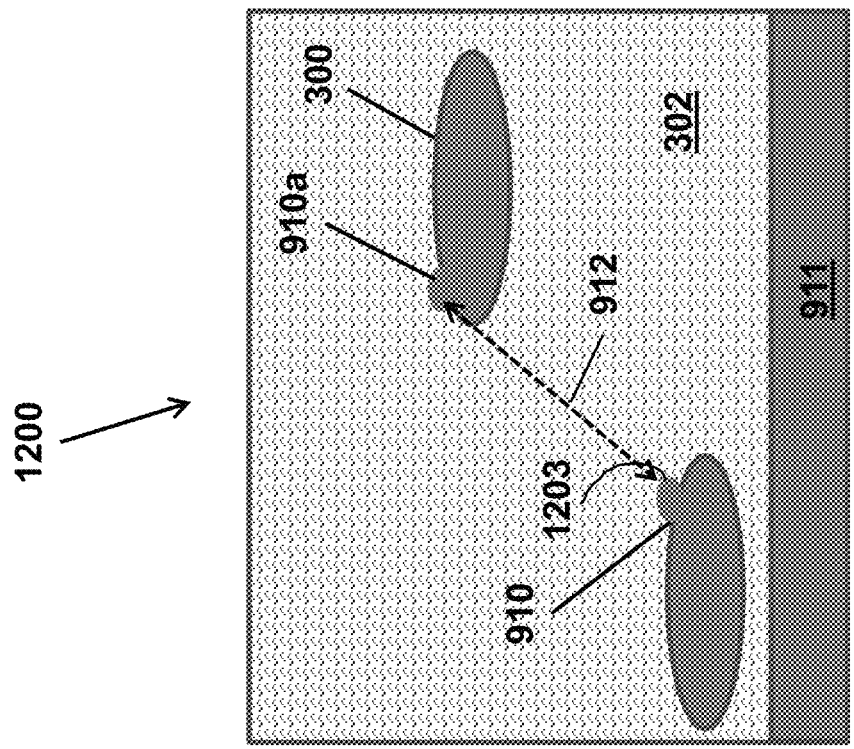
FIGS. 13a and 13b are schematic illustrations (not to scale) showing a strategic example of the optical communications system establishing a link between mobile nodes.
Figure 13A:
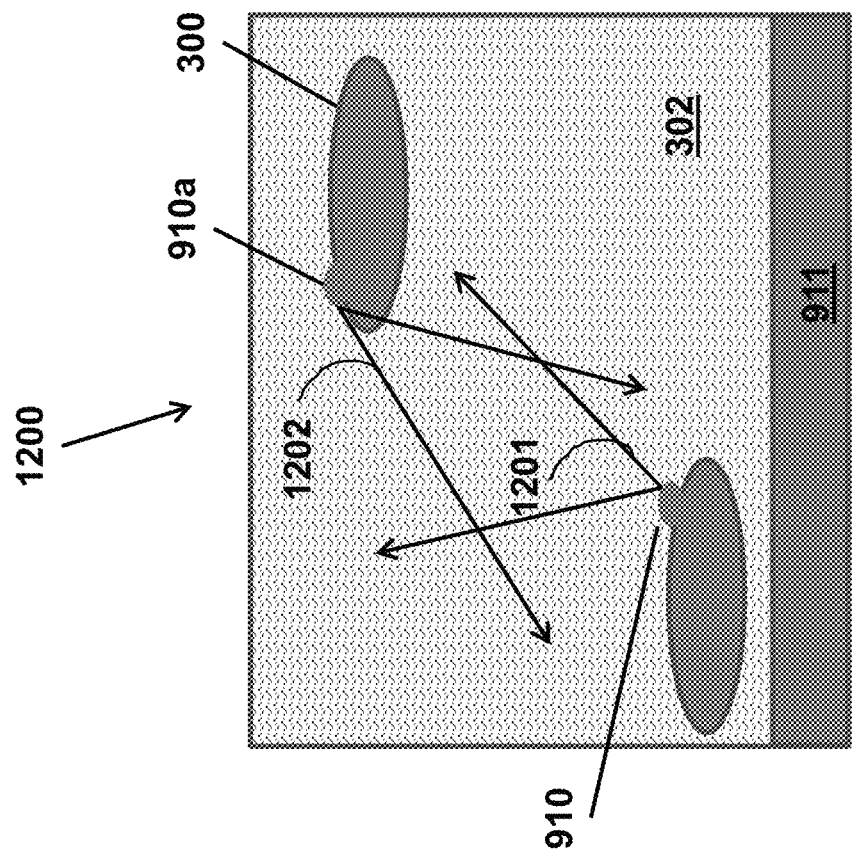

In FIG. 13a and FIG. 13b, there is provided a strategic view of an FSO communications system 1200, during a connection to be made in optical medium of water 302. The communications system 1200 has at least one optical signal node 910 positioned on a mobile platform 300 and a further node 910a positioned on a second mobile platform 300.

FIG. 13a provides an example of the acquisition of a further node 910a of the FSO communications system 1200, whereby a first signal 1201 is transmitted into free space underwater 302 in search of the further node 910a, said first signal 1201 being highly diverged with, as a result, low irradiance. Once the first signal is received by the further node 910*a* it responds by conducting a similar action, transmitting a response signal 1202, which is highly diverged, in search of the optical communications system node 910, and so beginning the connection process.

FIG. 13*b* provides an example of the action that may be taken upon successful connection 912 of the signal node 910 and further node 910*a*, wherein the distance between the mobile platforms 300 may be decreased whilst maintaining the connection 912 and conducting data transfer, so that the transfer rate may be optimised and the risk of connection loss diminished. This process will likely include tracking as both nodes 910, 910*a* are on mobile platforms.

Advantageously, a smart transmit system which uses electronic beam steering for acquisition, tracking and data transfer is provided. Wide divergence beams are transmitted during the acquisition phase (with optional IFF), which are then switched to a narrower beams for the main transfer of information. This advantageously tends to reduce the power used to transmit at a set data rate. Also, data transfer tends to be more covert.

In some arrangements, the optical communications system 910 comprises a mechanical beam steering module, for example a pan/tilt unit, instead of or in addition to the electronic beam steering means.

In some arrangements, the optical communications system 910 comprises a different type of means for varying the divergence of a transmitted light beam instead of or in addition to the fluidic lens. For example, the optical communications system 910 may comprise a translating lens, a zoom lens, a programmable liquid crystal lens, or a programmable holographic lens (such as a switchable Bragg Element or a Digilens).

In the above arrangements, the vehicle illuminates the search area with beams having successively decreasing beam divergence, and hence successively increasing irradiance. In other arrangements, the vehicle may illuminate the search area in a different way.

In the above arrangements, the search area is scanned in a sequence of non-overlapping loops, which may be concentric circular loops. In other arrangements a different scan pattern may be used.

The invention claimed is:

1. A method of obtaining a connection between at least two optical signal nodes, of a Free Space Optical (FSO) communication system, the method comprising:
transmitting, via a plurality of transmitting devices of a first optical node, at least a first diverged optical signal and a second diverged optical signal into an optical medium, the first and second diverged optical signals being transmitted in different directions;
receiving, at a receiving device of a second optical node, one of the diverged optical signals;
transmitting, in response to receiving one of the diverged optical signals, via a transmitting device of the second optical node, a third diverged optical signal to a receiving device of the first optical node to establish a location of said first optical node; and
establishing a connection, after which, the first optical node transmits, via one or more of the plurality of transmitting devices, a narrower optical signal for the transmission of data via the connection, wherein the narrower optical signal has a beam divergence that is dependent upon a distance between the first optical node and the second optical node;
wherein the plurality of transmitting devices of the first optical node includes a center array of transmitters and additional transmitters arranged around a periphery of the center array of transmitters, wherein the first optical node transmits the narrower optical signal only via the center array of transmitters.

2. The method according to claim 1, wherein upon establishing the connection, at least one of the first and second optical nodes moves in the direction of the other of the first and second optical nodes such that the distance between the first and second optical nodes is decreased.

3. The method according to claim 1, wherein the first and second optical nodes each further comprises a lens to control the divergence of said first, second and third diverged optical signals.

4. The method according to claim 1, the method comprising:
transmitting, via at least one transmitting device of the first optical node, a plurality of optical signals, wherein the plurality of optical signals are transmitted as a sequence of optical signals having progressively decreasing beam divergence and increasing irradiance;
receiving, at the receiving device of the second optical node, at least one of the transmitted sequence of optical signals;
transmitting, in response to receiving the at least one of the transmitted sequence of optical signals, via a transmitting device of the second optical node, the third diverged optical signal to the receiving device of the first optical node to establish a location of said first optical node; and
in response to receiving the third diverged optical signal, ceasing the transmission of the plurality of optical signals by the first optical node.

5. The method according to claim 4, wherein the optical signals in the sequence are transmitted as a sequence of non-overlapping loops to scan at least part of the optical medium, and beam divergence of the optical signals in the sequence is:

$$\phi = \frac{\theta}{2j-1},$$

and radii of the loops in the sequence of loops are equal to $$r = \frac{k}{2j-1}\theta, \text{ for } k = 0, \ldots, j,$$

where $\theta$ is a maximum divergence of the corresponding transmitting device, and j is an integer.

6. The method according to claim 4, wherein the irradiances of the optical signals in the sequence are $$I_i = (2i-1)^2 I \text{ for } i=1, 2, 3, \ldots, \text{ wherein}$$

i is a sequence number of an optical signal;
$I_i$ the irradiance of the ith optical signal in the sequence; and
I is the irradiance of an optical signal having a beam divergence equal to a maximum beam divergence of the corresponding transmitting device.

7. The method according to claim 1, wherein the first, second and/or third diverged optical signal is a plurality of pulsed transmissions.

8. The method according to claim 1, wherein at least one node of the first and second optical nodes further comprises a wake-up sensor for the detection of a wake-up signal from the other of the first and second optical nodes, causing a change from a dormant state to an active state.

9. The method according to claim 1, wherein at least one of the first and second optical nodes further comprises an acoustic signal transmitter, utilised to signal its location to the other of the first and second optical nodes.

10. The method according to claim 1, wherein the center array of transmitters includes a lens, and wherein the first optical node transmits the narrower optical signal by adjusting the lens.

11. A Free Space Optical (FSO) system, comprising:
first and second nodes, remote from each other, each node comprising i) a plurality of optical signal transmitters arranged to each transmit radiation in a different direction, wherein the first node includes a center array of optical signal transmitters and additional optical signal transmitters arranged around a periphery of the center array of optical signal transmitters, and wherein the center array of optical signal transmitters comprises a lens, and ii) at least one optical signal receiver; and
a controller including a processor and configured to
cause transmission, via the plurality of optical signal transmitters, of a plurality of first diverged optical signals into an optical medium,
cause reception, via the at least one optical signal receiver of the first node, of a second diverged optical signal, the second diverged optical signal transmitted by at least one optical signal transmitter of the second node in response to receiving at least one of the plurality of first diverged optical signals, to establish a location of the second node,
after the location of the second node is established, adjust the lens of the center array of optical signal transmitters of the first node and cause transmission, only via the center array of optical signal transmitters, of a third optical signal that is narrower than the first and second diverged optical signals, to establish an optical connection between the first and second nodes, and
adjust a beam divergence of the third optical signal based upon a determined distance between the first and second nodes.

12. The FSO system according to claim 11, wherein the lens of the center array of optical signal transmitters includes a translating lens, a zoom lens, a fluidic lens, a programmable liquid crystal lens, or a programmable holographic lens.

13. The FSO system according to claim 11, wherein the center array of optical signal transmitters includes uLEDs, LEDs, laser diodes, or vertical cavity surface emitting lasers.

14. The FSO system according to claim 11, wherein at least one of the first or second nodes is located on a mobile platform.

15. The FSO system according to claim 14, wherein the mobile platform is a submersible vehicle.

16. The FSO system according to claim 15, wherein the system operates wholly submerged in water.

17. A computer program product including one or more non-transitory machine-readable mediums encoded with instructions that when executed by one or more processors cause a process to be carried out for obtaining a connection between at least two optical signal nodes of a Free Space Optical (FSO) communication system, the process comprising:
causing transmission, via a plurality of optical signal transmitters of a first node, of at least a first diverged optical signal and a second diverged optical signal into an optical medium, each of the first diverged optical signal and second diverged optical signal being transmitted in a different direction;
causing reception, via an optical signal receiver of the first node, of a third diverged optical signal, the third diverged optical signal transmitted through an optical medium via an optical signal transmitter of a second node remote from the first node, to establish a location of the second node;
after the location of the second node is established, adjusting a lens of the first node and causing transmission, via the lens and at least one optical signal transmitter of the first node, of a fourth optical signal that is narrower than the first, second and third diverged optical signals, to establish an optical connection between the first and second nodes; and
adjusting a beam divergence of the fourth optical signal based upon a determined distance between the first and second nodes,
wherein the plurality of optical signal transmitters of the first node includes a center array of transmitters and additional transmitters arranged around a periphery of the center array of transmitters, wherein the first optical node transmits the fourth optical signal only via the center array of transmitters.

18. The computer program product according to claim 17, wherein once the location of the second node is established, the process includes: causing transmission, via the lens and the at least one optical signal transmitter of the first node, of a sequence of optical signals having progressively decreasing beam divergence and increasing irradiance, to establish the connection.

19. An underwater platform including the computer program product according to claim 17, wherein the optical medium is water and the process operates when the platform is wholly submerged in water.

20. The computer program product according to claim 17, wherein at least one node of the first and second nodes comprises a wake-up sensor, and wherein the process further comprises detecting a wake-up signal from the other of the first and second nodes, and causing a change from a dormant state to an active state.

* * * * *